May 16, 1933.  F. B. ADAM  1,908,941
LIGHTING CONTROL APPARATUS
Filed Aug. 17, 1928   4 Sheets-Sheet 1

FIG. 1

INVENTOR
FREDERICK B. ADAM.
BY
Eilers & Schaumburg
ATTORNEYS

May 16, 1933.　　　F. B. ADAM　　　1,908,941

LIGHTING CONTROL APPARATUS

Filed Aug. 17, 1928　　4 Sheets-Sheet 2

INVENTOR
FREDERICK B. ADAM
BY
ATTORNEYS

May 16, 1933.　　　　F. B. ADAM　　　　1,908,941

LIGHTING CONTROL APPARATUS

Filed Aug. 17, 1928　　　4 Sheets-Sheet 4

INVENTOR
FREDERICK B. ADAM
BY
　　Eilers & Schaumberg,
　　　　ATTORNEYS

Patented May 16, 1933

1,908,941

UNITED STATES PATENT OFFICE

FREDERICK B. ADAM, OF ST. LOUIS, MISSOURI

LIGHTING CONTROL APPARATUS

Application filed August 17, 1928. Serial No. 300,194.

My invention relates to lighting control apparatus of the type in which dimmers are employed, and which is extensively used in theaters and auditoriums; and more particularly to the means by which the circuits are controlled in order to produce desired lighting effects.

An object of my invention is to provide an improved control system for the dimmers whereby they may be operated individually, in groups, or all as a unit, and in which individual dimmers may be selectively grouped or interlocked, either for direct or cross control.

Another object of my invention is to provide a dimmer control system which is combined with the switching system used in lighting installations in theaters and auditoriums in order that the switching and dimmer controls may be in proximity for ease of manipulation; this is contrary to the prevailing practice of locating the controls according to the nature or kind of control, rather than according to the circuit to be affected, as in the apparatus hereinafter described.

Another object of my invention is to provide a lighting system comprising a plurality of similar compact units in which the dimming and switching controls are combined in units in a dead-face switchboard, and in which the openings for the dimmer controls are adapted to be closed automatically, by means operable by the dimmer control handles.

A further object of my invention is to provide a dimmer control system for a dead front board so that the position of the individual dimmers, their relationship to each other, whether as individuals or in groups, and their set-up for group, or cross-control, may be readily ascertained either by sight or touch.

A further object of my invention is to provide a dimmer control apparatus for a dead front board in which the separate dimmers may be interlocked for group control, and in which there is a visible means to indicate the position of the interlock mechanism of the various dimmers.

A further object is to provide a dimmer apparatus in which the dimmers and their manipulative controls are connected by adjustable means.

With the foregoing objects in view, I will describe my invention, which consists in the novel construction, combination and arrangement of parts hereinafter fully and concisely described, definitely pointed out in the claims, and illustrated by the accompanying drawings, in which Fig. 2 is a plan view of an individual dimmer control lever mounted on a shaft; and Fig. 3 is a side view of an individual dimmer control lever, partly broken away, to show the mechanism by which the lever may be interlocked with the shaft for group control. Fig. 4 is a side elevation, partly broken away, and Fig. 5 an end view of the rack rod clamp shown in Fig. 1.

Referring to the drawings, (Fig. 1), "A" is a dimmer assembly which may be of the rack and pinion type illustrated. This dimmer is operated by an individual dimmer control mechanism, "B", which is mounted on a shaft adapted to carry a plurality of such controls for the purposes of group and cross control as hereinafter described.

The control "B" consists of a substantially U-shaped frame 1, (best shown in Fig. 2) having an opening 2, through each of its legs, or sides, whereby the frame may be positioned on and freely rotated about a control shaft 3. These openings are preferably provided with external flanges 4, in order to form hubs for the frame. Each side of the frame is provided with a plurality, preferably, of internally threaded openings 5, disposed equidistantly from the center of the opening 2. The frame is also provided with a spacer 6, between its legs and intermediate their ends and the bridge, or base 7, of the frame, as shown. By preference, this spacer is rigidly attached to the sides of the frame, as by riveting, and serves to keep them in proper spaced relation.

Figures 2, 3, 4, 5:
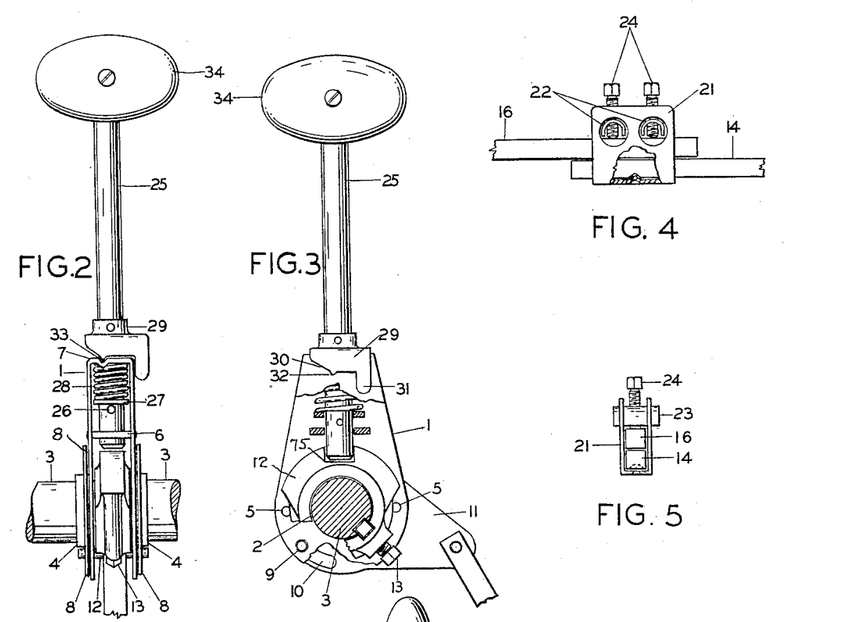

On the outside of each leg of the frame, and in slidable engagement with the surface of the leg, I place a dimmer lever plate 8, having an opening therethrough of such diameter that the plate may be mounted on and rotated about the flange 4, which serves as its bearing. These plates are detachably connected to the sides of the frame as by bolts 9, which pass through elongated, arcuate shaped openings or slots 10, in the plates and are seated in openings 5, in the frame. The dimmer lever plates 8 are each provided with an arm 11, preferably integral therewith, for suitable connection between the dimmer assembly "A" and its control "B". By making the plates 8 rotatable relative to the frame 1, I am able to adjust the arms 11 angularly, relative to the frame; and by means of the arcuate shaped openings 10, and the bolts 9, desired adjustments can be maintained while these parts are assembled. It will be understood that while I prefer to use a pair of these plates and place the connection to the dimmer between them, as shown, that I am not limited to such an arrangement, but may connect each plate to one or more dimmers.

As shown in Fig. 2, a collar 12, mounted on the shaft 3, is positioned between the sides of the frame and secured to the shaft by suitable means such as the set screw 13. This fixed collar does not interfere with the free rotation of the frame around the shaft, but prevents movement of the frame along the shaft and maintains the desired alignment of the lever plate 8, with the dimmer assembly.

Figure 1:
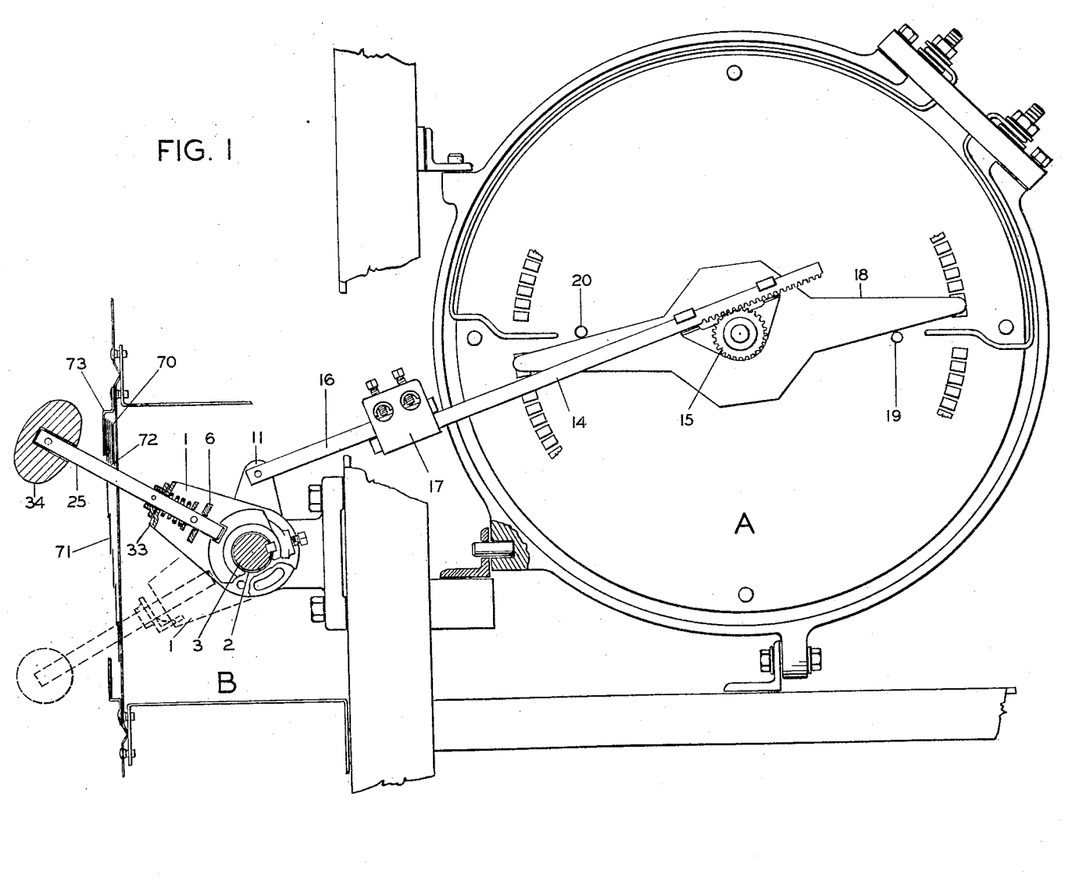
Fig. 1 is a side elevation of an individual dimmer and its control assembly.

In Fig. 1, I show a preferred form of connection between the dimmer "A" and its control "B" which comprises a rack rod 14, engaged with the dimmer pinion 15, an adjustable extension rod 16, connected to the arm 11, or intermediate a pair of such arms, by a pin or other suitable device, and a clamp 17, which permits variations in the length of the connection.

From the foregoing description of parts, it will be obvious that as the frame 1 is moved pivotally on the shaft 3, as into the dotted position indicated in Fig. 1, that this motion will be transmitted to the dimmer pinion 15 by means of the rack rod 14, and cause a movement of the dimmer contactor 18; and that the direction of movement of the contactor, whether toward bright or dark, is dependent on the direction of movement of the frame. If, therefore, the frame 1, is set substantially horizontal or midway between its positions shown in Fig. 1, and the contactor 18, is set in an intermediate position between the stops 19 and 20, one movement of the frame will move the contactor toward dark, and an opposite movement of the frame will move the contactor toward bright. It is likewise obvious that the travel of the frame and contactor may be synchronized by angular adjustment of the arms 11 relative to the frame, setting of the rack on the pinion relative to the position of the contactor, and fixing the length of the connection by means of the clamp 17.

In Figs. 4 and 5 I show the details of the clamp 17. It is preferably formed of sheet metal, and consists of a channeled element 21, of sufficient length to afford a support for the rack rod 14, and adjustable extension rod 16; of sufficient width to allow but one rod to slide freely therein; and of sufficient depth to accommodate both rods when positioned adjacent each other. At least two openings 22, preferably circular, are made in each side of the element at a suitable distance from its base to accommodate the rods, and, by preference, the openings in the opposite sides register so that a clamp nut 23, preferably of arcuate section, may reside in a pair of oppositely disposed openings and bear against the wall of each opening. As shown, the clamp nut has a tapped opening therein to permit a set screw 24, to project through the nut, between the sides of the element, and bear against the adjacent rod. By tightening the screw the nut is brought into engagement with the sides of the element 21, and the rods are rigidly held in immovable contact between the screw and the base of the channeled element. I prefer to make the rods 14 and 16 square in section, so that there will be no tendency for them to turn in the element, and so they may be selectively positioned in the clamp. By this arrangement the clamp may be disposed vertically with either rod over the other, or the clamp may be disposed horizontally and the extension rod offset, from either side of the rack rod, to connect with a control assembly which is offset from its dimmer.

Each individual control is provided with a locking plunger 25, which resides between the sides of the frame 1, is disposed in appropriate openings in the spacer 6, and bridge 7, and extends beyond the bridge and frame. Between the spacer and bridge, the plunger is provided with a pin 26, a washer 27, and a coil spring 28, positioned around the plunger, so that the spring is adapted to be compressed between the bridge and washer and hold the plunger in engagement with the collar 12, when desired. The spring also acts as a stop to prevent the plunger from being drawn out of its seat in the spacer. The plunger carries an L-shaped member 29, attached thereto as by a pin, adapted to overlie the bridge and side of the frame. This member has an inclined face 30, which may bear upon the edge formed by the bridge and leg of the frame and which, upon rotation, will reciprocate the plunger relative to the collar 12. The member is preferably formed with a stop 31, to prevent over-rotation of the plunger, and a projection 32, adapted to seat in a depression 33, in the face of the bridge.

Figures 7, 8, 11:
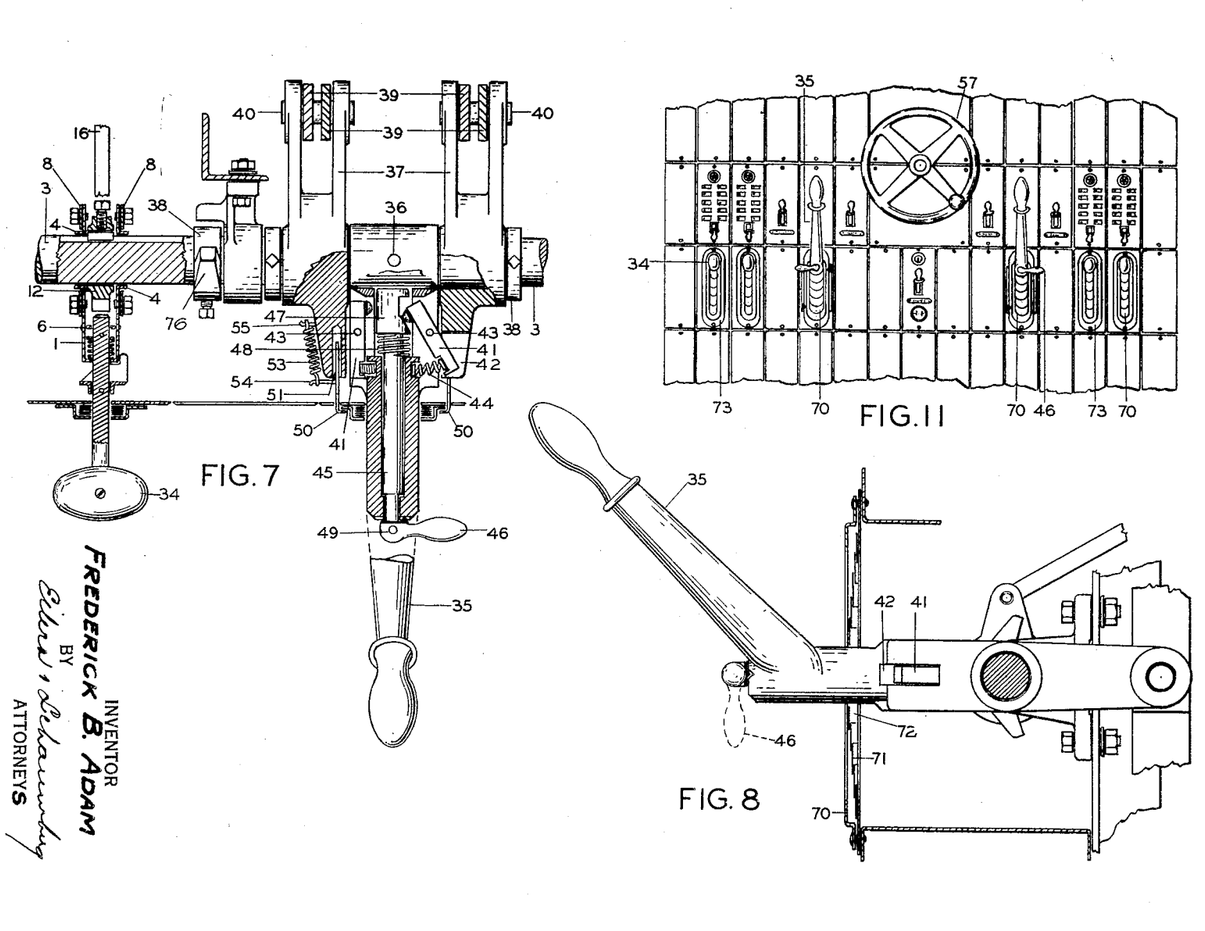
Fig. 11 is a front elevation of a portion of a switchboard showing my preferred arrangement and combination of switching and dimming control units.

The collar 12, is provided with a slot or recess 75, adapted to accommodate the end of the plunger whereby the frame 1, may be interlocked with the shaft 3, for group control as shown in Fig. 7. It will be apparent that upon rotation of the plunger 25, the member 29, will be rotated until the stop 31 engages the side of the frame; that such rotation will withdraw the plunger from the collar and ride the element 29, on the bridge; and that the element 29 will hold the plunger away from the collar and prevent its accidental displacement by means of the projection 32, and depression 33. This is the position for individual dimmer control as shown in Fig. 2, and by dotted lines in Fig. 1. By this means the control may be disconnected from the shaft and set in individual control position by a gradual, rotary motion, thus eliminating the jerk and rotation which are incident to a change of setting with the controls heretofore employed.

The plunger 25, is equipped with a handle 34, preferably of an elongated form, as ellipsoidal, and attached thereto by a screw or other suitable means. The handle is positioned on the plunger so that, for example, it will be horizontally disposed when the plunger is disengaged from the shaft, (Fig. 2) and vertically disposed when interlocked with the shaft, (Fig. 3), and by this means its setting, whether individual or group, may readily be ascertained either by sight or touch.

For group control of the dimmers, a plurality of the individual controls are mounted on a common control shaft 3, with which they may be selectively interlocked or operatively connected by means of plungers 25 and collars 12. In order to actuate the control shaft, a master control lever 35, of suitable length and shape to permit ease in rotating the shaft, is fixed thereto by a pin 36, or the equivalent. Actuation of lever 35 simultaneously operates all dimmers whose individual controls are interlocked with the shaft. These may be ascertained and determined by the positions of the individual handles 34.

As will best appear in Fig. 7, a shaft connector lever 37 is disposed on each side of the master control lever, and is adapted to rotate freely on the control shaft. Each of the levers 37 may be positioned between the master lever and a set collar 38, which may be secured to the shaft by a set screw or the equivalent, (not shown). As will appear in Fig. 7, some of the collars 38 may be provided with projections or wings 76 integral therewith, and adapted to serve as stops to limit the angle of rotation of shaft 3. The shape of lever 37 is not material, but I prefer to make it bifurcated in form as shown, to accommodate connectors 39, the purpose of which will appear later. These may be attached to the lever by a pin 40 as shown, or other suitable means. As a clutch, or means for the selective operative engagement of levers 37 by the master lever, I have provided an interlocking dog 41 on each side of the master lever. Each lever 37 has an opening 42 of a shape to register with and receive one end of the dog. Each of the dogs 41 is pivoted on a pin 43, and the dog is provided with a spring 44 near its outer end, tending to force this end of the dog into engagement with slot 42 when the master lever is appropriately positioned.

To provide for control of the positions of the interlocking dogs, the master lever 35 is provided with a longitudinal bore, as shown, in which there is located a cam shaft 45, preferably projecting through the bore and provided at its outer end with an indicating handle 46. The inner end of the cam shaft has a peripheral cam surface 47, upon which the inner ends of dogs 41 impinge, and by which they are adapted to be controlled. The inner end of each dog will obviously be kept in contact with the cam surface by the pressure of spring 44. A spring 48 may be used to retain the cam shaft, by friction, in any adjusted position.

In the preferred arrangement, as shown, a dog 41 will engage a recess 42 only when a low point on surface 47 is turned toward the particular lever 37 which is to be interlocked with the master lever. The inner end of the dog recedes as it follows the cam surface, and the outer end of the dog is forced out to engage the slot 42, and to interlock the master lever and one of the levers 37. Since the cam surface 47 is provided with only one low point, it will be seen that the preferred arrangement illustrated provides for interlocking the master control lever 35 with only one of the levers 37 at a given time.

By preference, the indicator handle 46, which serves to actuate the cam shaft 45, is connected thereto by means of a pin 49. The handle 46, being of elongated form, serves as an indicator for showing the position of the cam shaft, and hence it shows at a glance which, if either, of the levers 37 is operatively interlocked with the master control lever or in a position to be interlocked. The cam shaft 45 may be turned through one-half a revolution. When the handle 46 is pointing downward, neither of the dogs 41 can ride the low point of the cam surface 47, hence neither is engaged with its adjacent lever. The master control lever is now operable independently of either of the adjacent levers 37, and hence serves to control only its own particular group or color row. When the indicating handle is turned to the left or to the right, it permits the dogs 41 to engage the levers 37 on the left or the right hand side, respectively, of the master control lever. The handle 46 thus indicates the particular one of the levers 37 with which the master control lever has been, or will be, interlocked; it also indicates at a glance whether the master control lever is interlocked or will be interlocked on movement thereof, or whether it is in non-interlock position, or in engagement only with the control shaft by which it is carried.

Figure 6:
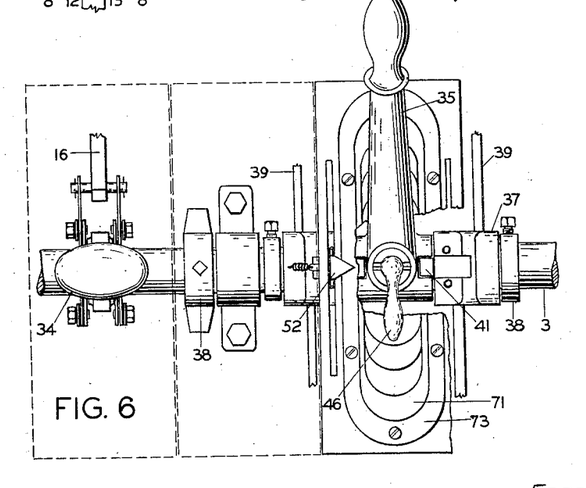
Figs. 6, 7 and 8 show, respectively, a front elevation, a horizontal sectional view, and a side view, respectively, of a master dimmer control lever and its interlock mechanism.

As will appear from Figs. 6 and 7, each of the levers 37 is preferably provided with an indicator 50, which projects through the control board and indicates thereon the exact position of each of the levers 37, which are concealed by the control board. This enables the operator to know at all times the exact position of each of these levers and avoids the movement of the master control lever up and down in search for the position in which the master control lever will engage the lever 37. The indicator 50 may consist of an arm projecting outwardly from each of the levers 37, and retained in a suitable slot or recess 51, in the lever, (see Fig. 7). The outer extremity of the arm may be bent to form a pointer 52. Since it is desirable, because of the plane front surface of the control board, that the pointer should travel in a straight line, it is necessary, because of the arcuate path of movement of lever 37, to retain the arm, yieldingly, in the slot 51. Provision for this has been made by a spring 53, one end of which may be secured to a bracket 54 on the arm 50, and the other end fastened to a pin 55, or its equivalent, positioned on the lever. As it is contemplated that the pointer 52 will follow a plane indicating surface; in so doing, the spring 53 permits the indicator to be extended and retracted to allow the straight-line motion of the pointer, as the lever by which it is carried moves on an arc.

It will be seen that from the position of the handle 46, and from the indicated positions of the levers 37, the operator can determine at a glance, which of the various parts of the mechanism are operatively interlocked.

Figure 9:
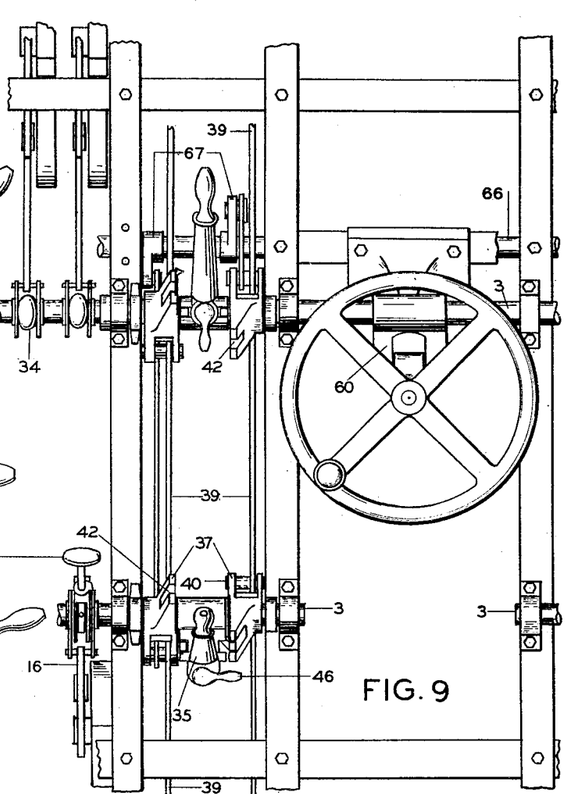
Fig. 9 is a front elevation of a slow motion wheel drive dimmer control, shown in assembly, with two master dimmer levers and several individual dimmer control levers.
Figure 10:
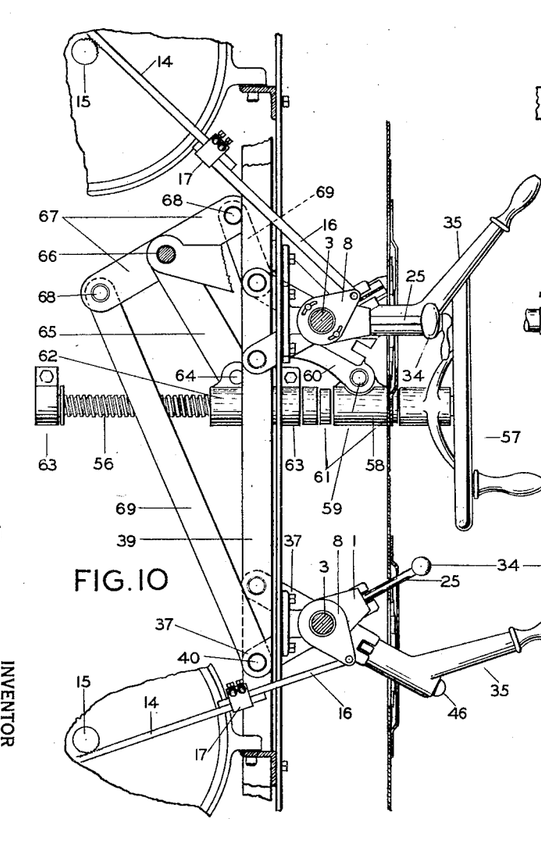
Fig. 10 is a side view of the assembly illustrated in Fig. 9, showing front plates and slot closers in section and also portions of two rows of dimmers.

From Figs. 9 and 10 it will appear that I have contemplated the inter-connection of several of the control shafts, each controlling a separate group of dimmers, and that the groups may be so interlocked as to be operable from a single master control lever 35.

In an installation where one or more groups of dimmers are located above another, as shown, each of the levers 37, through its pin 40, is connected to a corresponding lever above or below it by means of a connector 39. This is preferably a straight rod or link, serving as a positive driving connection between the levers connected by it. Any one of the master levers 35, associated with the levers 37 which are thus connected, may be used to operate the several groups thus operatively linked together.

While I have shown the connectors 39 as straight links for interlocking superimposed dimmer controls, they may obviously be modified to permit interlocking of horizontally aligned control groups, as well as those in different horizontal planes.

It is especially advantageous when the individual dimmer controls are disposed in rows or groups, and where the different groups may be used for controlling lights of different colors, that the handles 34 and the master control levers 35, be colored to indicate the color of lights affected thereby. The color of each group of handles and levers preferably corresponds to the color of lights controlled thereby.

In installations comprising a large number of dimmers, the simultaneous operation of all or any considerable number of the dimmers involves a substantial manual effort. A slow motion control is conducive to regularity of operation, and minimizes the effort required. It also provides for a close regulation of the degree of illumination, as well as for a satisfactory cross control. For cross control, provision has been made in the present device to enable any chosen group of dimmers to be operated reversely, or oppositely, to others in the same installation. By this arangement, certain lights may be dimmed as others are made brighter. This arrangement also provides for a very valuable blending of colors, and the production of unique, multi-color schemes.

The details of construction of the slow motion dimmer control will be seen by reference especially to Figs. 9 and 10, in which 56 is a threaded shaft, or worm, provided as shown, with a comparatively coarse thread over a portion of its length. On the outer end of the shaft is preferably affixed a hand wheel 57. The threaded shaft 56 is mounted in a bearing 58, by preference located near the hand wheel, and is carried by and pivoted at 59 to a bearing support 60. The pivoted bearing support provides for self-alignment of the bearing, which allows the shaft 56 a certain latitude of angular movement about the pivot 59. The bearing support may be mounted in turn on the framework of the assembly. To take care of thrust, and to position the shaft 56 longitudinally, a pair or more of thrust bearings 61, of any suitable type, may be mounted substantially as shown.

On the worm of shaft 56 is carried a traveling nut 62, the limits of travel of which may be determined by collars 63, clamped or locked around the shaft near each extremity of the threaded portion thereof. These collars serve to prevent over-running and consequent jamming of the various parts of the slow motion mechanism. The traveling nut 62 is connected through a pivoted joint 64 to a drive lever 65. The pivot 64 permits a limited angular movement between the traveling nut 62 and drive lever 65. The opposite end of the drive lever 65 engages a slow motion shaft 66, and is preferably keyed or otherwise securely fastened thereto. This shaft may be supported in suitable bearings, (not shown) and bracketed to the framework of the assembly.

On opposite sides of each of the master control levers 35, the rocker shaft 66 carries a pair of drive arms 67, fixed to the shaft on opposite sides thereof and diametrically opposite each other. Each pair of the arms is spaced on the shaft to correspond substantially to the spacing of levers 37 on the control shaft, the arms being aligned with levers 37 (see Fig. 9.) Each arm 67 is pivotally connected at 68 with a slow-motion connector 69. The connectors 69 are of such lengths, as to connect, operatively, the drive arms 67 with the levers 37, one end of each of the connectors 69 pivotally engaging the pin 40 on a lever 37, described above. Due to the spacing of arms 67, on the rocker shaft, it will be seen that each of a pair of connectors 69, engages a lever 37, and that these levers are on opposite sides of the tier of master control levers 35. Each connector 69 engages one of a pair of levers 37, on a control shaft; the paired connector being in operative relation with another of a different pair of levers 37, preferably on a different control shaft, as shown.

The operation of the slow-motion dimmer control is as follows:

Rotation of shaft 56 by means of the hand-wheel 57, causes the traveling nut 62 to move inwardly or outwardly along the shaft. As the nut travels, the end of drive lever 65, pivoted at 64, is caused to move with the nut. The opposite end of drive lever 65 being positioned by and affixed to the rocker shaft 66, serves partly to rotate this shaft, and hence to move the drive arms 67 through a substantial angle. Since the drive arms are on opposite sides of the shaft, one of each pair thereof, is raised as the other is lowered. A result of this arrangement is that the paired levers 37, adjacent a particular master control lever, will move in opposite directions. Since provision has been made, through dogs 41 and recesses 42, to connect only one of the levers 37 to a particular control shaft at a given time, the direction of rotation of this shaft will depend upon the direction of rotation of the hand wheel 57, and the interlock of the master control lever with one of its levers 37.

In installations having one row of dimmers above another, as shown in Figs. 9 and 10, all of the vertically aligned levers 37, for example, those to the right of their respective master control levers, will move in the same direction for a given direction of rotation of wheel 57 and shaft 56. This is due to their operative association with connectors 39, as described above. From this construction, it will be seen that direct, or regular, control, as distinguished from cross control, of the several rows or groups, may be effected by interlocking the desired master control levers 35 to levers 37, all of which are on the same side of the selected master control levers. Those levers 37 which are on opposite sides will be moved oppositely, but are inoperative to rotate the control shafts because they rotate freely on the shafts as above described.

To effect a cross-control of several rows of dimmers, one, or more, of the master control levers is interlocked with levers 37 on one side, and others of the master control levers interlocked with levers 37 on the opposite side of the master levers. With this arrangement, when the slow motion drive is operated, the master control levers thus oppositely interlocked, will move in opposite directions, and the control shafts, with the interlocked individual dimmers, will rotate oppositely. By this means certain lights may be increased in brightness, as others are dimmed.

In some installations, it may be desired to effect the described cross-control of the dimmer groups, without the use of the slow motion device. This may be accomplished by omitting or disconnecting the drive lever 65; as a result of this, a plurality of the dimmer rows may be cross-controlled, by interlocking as described, and by actuating one of the interlocked master control levers. If desired, the wheel 57, shaft 56 and lever 65 may be omitted entirely, and the slow motion shaft 66 actuated by a master control lever through connectors 69 and arms 67. This practice is satisfactory in smaller installations, in which the slow motion apparatus is not required for obtaining the requisite nicety of control.

It is usually necessary to provide a front or board, which conceals the dimmers and a portion of their controls. In such a case, openings of substantial length must be made to provide for the throw of the individual dimmer control handles and the master control levers. These openings or slots mar the appearance of the assembly unless automatically kept closed by some practical means. To this end, I have provided slot closers 70 (see Figs. 1 and 10), consisting of a plurality of relatively thin leaves 71, preferably of sheet metal. The leaves are adapted to slide one upon the other, by the movement of the particular lever or handle, in such a way as to keep the slot closed. In the example shown, and as indicated in Fig. 11, the leaves 71 are oval in form, are progressively proportioned, and each leaf is provided with an elongated central opening or slot 72, proportioned to the size of the leaf. The control handle or lever extends through all of the leaves, and by preference the smallest of the leaves has an opening just sufficient to receive the handle. The leaves may be slidably retained by a guide flange 73 on each side of, or surrounding the slot. By preference the assembly of leaves 71 is a pyramid arrangement of the different size leaves, about the handle or lever.

As the lever, for example, an individual dimmer control lever, is moved upwardly from a central position, the smallest of the leaves will follow its movement. After a certain continued movement of the lever, it will reach the end of the slot in the adjacent leaf, which will thereafter follow the lever. Continued movement of the lever moves the third, then the fourth leaf in turn. The relative sizes of the leaves and their slots are so proportioned that each of the slots is completely covered at all times by one or more of the leaves. The movement and effect of the leaves, while moving the lever downward, is the same as described, except that direction of movement is reversed.

The described apparatus, considered collectively, is characterized by simplicity and durability of construction, and ease and convenience of operation. These qualities, with an unusual neatness in appearance, serve to distinguish it from the equipment hitherto available for analogous purposes. Before the advent of apparatus embodying the described principles of construction, the practice was to group all like switching and controlling devices together, i. e., according to type of control and without particular reference to the circuit to be controlled. It will be seen that the present invention provides for combining all of the controls affecting a given circuit, in a unit, the space relations and general arrangement of the dimmer controls being such that they may be located on the same part of a switchboard with a direct and remote switching control, pre-selectively controlled switches and other apparatus, as shown in Fig. 11. The economy of time and energy of the operator resulting from the improved described arrangement will be apparent.

Although my invention consists largely in the construction and arrangement of parts hereinbefore described and particularly pointed out in the claims, yet I do not limit my invention to the precise form or construction of parts shown or the several parts thereof, inasmuch as various alterations may be made without changing the scope of my invention.

I claim as my invention:

1. In a lighting control system comprising a plurality of dimmers arranged in superimposed rows, manipulative elements detachably connected with said rows, means whereby each row may be operatively connected with a manipulative element, and means whereby any selected plurality of said rows may be simultaneously operated by any one of the connected manipulative elements.

2. In a lighting control system, a dimmer, a manipulating element therefor, spaced from the dimmer, a connecting rod between the dimmer and element formed of connected sections, and a device for connecting said sections, including combined means for adjusting the length of the rod and for compensating for misalignment of the dimmer and element.

3. In a lighting control system, a dimmer, a control element therefor, spaced from the dimmer, a sectional drive rod connecting the dimmer and control element, and clamping means associated with the sections of the rod, and adapted for adjusting its length, and varying the alignment of the sections.

4. In a lighting control system, a dimmer, a control member therefor, spaced from the dimmer, a sectional element connecting the dimmer and control member, and an apertured clamping member associated with the connecting element, for compensating for discrepancy in alignment of the dimmer and the control member.

5. In a lighting control system including a dimmer, an operating element for the dimmer, a connector between the element and dimmer, a member angularly adjustable relative to the operating element and having a slotted opening, and holding means extending through the opening to the element.

6. In a lighting control system including a dimmer, an actuating rod therefor, a control means, a plate associated with the control means and rod, and having an arcuate slot therethrough; holding means extending through the slot, to the control means and adapted to coact with the slotted portion of the plate to permit variation of the angular relations between said control means, plate and rod.

7. In a lighting control system having a plurality of dimmers arranged in rows, a control shaft for each of said rows, a plurality of levers on each shaft, a manual control element for said shaft, adapted for selective connection with said levers, a plurality of connecting rods each having pivoted connection with one of said levers on each shaft, means coordinating the movement of the connecting rods, and means for actuating one of said connecting rods, to control a plurality of said dimmer rows.

8. In a lighting control system having a plurality of dimmers arranged in rows, a control shaft for each of said rows, a pair of oppositely movable elements for each of the shafts, a plurality of the elements being similarly movable, a connector between the similarly movable elements, means for selectively connecting each of the shafts to either of its movable elements, and an operating member for the connected shafts.

9. In a lighting control system, a plurality of dimmers arranged in rows, a control shaft for each row, a master control lever carried by each control shaft, clutching means carried by said shafts, and associated with the control levers, and oppositely movable shaft connecting members coacting with the clutching means, for operatively interconnecting and selectively directing the movement of any plurality of said shafts, upon a given movement of any of said master control levers, slow-motion operating mechanism including a screw, and elements constituting a driving connection between said shaft connecting members and said screw.

10. In a lighting control system, a plurality of dimmers disposed in rows, a control shaft for each row, means for operatively interconnecting, and selectively determining the direction of movement of any plurality of said shafts, a rocker shaft operatively associated with said shaft interconnecting means, a manually rotatable screw, a nut adapted to travel along the screw, and a connecting element between the nut and the rocker shaft.

11. In a lighting control system, a plurality of dimmers arranged in superimposed rows; a control shaft for each row; each of said dimmers having a control handle disposed on a control shaft, and adapted for individual dimmer operation, and to be selectively connected to and disconnected from the control shaft; a pair of oppositely movable interlock levers, rotatably disposed on each control shaft; a control shaft operating handle secured to each control shaft between said levers; a clutch associated with the control shaft handle for operatively connecting said handle and either of the interlock levers, and adapted to determine the direction of rotation of its associated shaft; a connector between the interlock levers on each side of the handles; and means, coacting with the levers, handles, clutches and shafts, for rotating any plurality of said shafts in predetermined relative directions.

12. In a lighting control system, in combination with individual circuit dimmers, arranged in a plurality of dimmer rows, manual control elements associated with the several dimmer rows, means for operatively associating with each other, any of the dimmers in any selected plurality of said rows, and means for moving certain of the associated rows, oppositely to other of said rows, said means operable upon movement of one of said row-control elements.

13. In a lighting control system, a plurality of dimmer rows, a control member for each of said rows of dimmers, means associated with said control members for operatively interconnecting any selected plurality of said rows, and a control element adapted for common connection with said interconnected rows, said control element and each row-control member being adapted selectively for effecting cross control of any selected plurality of said rows.

14. In a lighting intensity control system, in combination with a dimmer bank and switchboard section, a dimmer cover plate having an elongated slot therethrough, a dimmer operating shaft, an operating element for each dimmer, carried by said shaft and adapted for individual dimmer operation, a connecting rod between the dimmer and operating element, means for adjusting the length of said rod; an actuating lever for said operating element, extending through the slot in said cover plate, interlock means associated with said lever and operating element for interlocking said element with said dimmer operating shaft, and means on the free end of said actuating lever adapted to indicate whether said dimmer operating element is arranged for individual dimmer operation, or interlocked with said operating shaft for operation thereby.

15. In a lighting intensity control system, in combination with a dimmer bank and switchboard section, a dimmer bank cover plate having an elongate slot therethrough, a dimmer operating shaft, an operating element for each dimmer, carried by said shaft and adapted for individual dimmer operation, a connecting rod between the dimmer and operating element, means for adjusting the length of said rod, means for adjusting the connection between said rod and operating element, and an actuating lever for said operating element, extending through said cover plate slot, the several adjusting means being coordinated with the limited movement of the actuating lever, as defined by the limits of the slot, to result in full operation of the associated dimmer.

16. In a dimmer bank section assembly, a plurality of dimmers, an operating shaft for the dimmers, an operating assembly for each of the individual dimmers including a collar adjustably secured to the said shaft, a sheet metal frame member consisting of two arm portions each apertured to receive the shaft and disposed on opposite sides of said collar, a bridge piece connecting the said arms at a distance from the said shaft and collar, an actuating lever extended through an aperture therefor in the said bridge piece, and arranged for a limited rotative movement therein, the said collar being provided with a recess, and the inner end of said lever adapted to be selectively engaged in said recess, whereby selectively to effect an operative connection between the said operating assembly frame and the said collar and shaft, a spring mounted on the said lever and between the arms of said frame, a punched metal stop member secured to the said lever and overlying the bridge portion of the frame to latch the said lever in its several angularly adjusted positions, and a handle secured to the outer end of the lever, said handle being of elongate form with its major axis normal to the axis of the said lever, whereby the handle indicates the operative connection and disconnection of said lever and collar.

17. In a dimmer bank section assembly, a plurality of dimmers arranged in superposed rows, a cover plate for each dimmer, an actuating shaft common to the dimmers of each row, an individual actuating assembly for each of said dimmers and associated with the shaft therefor, a master control lever secured to said shaft, a pair of interlock levers carried by but mounted for rotation on said shaft, one of said levers being mounted on each opposite side of said master lever, connections from each of said interlock levers to corresponding interlock levers on the shafts of superposed dimmer rows, an interlocking device including a pair of interlocking dogs, each pivotally carried by the master lever, a recessed seat for one of said dogs carried by each of said interlock levers, a dog-actuating cam assembly extending through and operable within the master lever and provided with a camming surface operable to engage said dogs one at a time so as selectively to connect the master lever with said interlock levers, and a handle carried by said camming device and projecting at an angle therefrom, in front of said cover plate, so as to indicate the position of said dogs whereby to show the interlock relation between the master lever and the said interlock levers.

18. In a composite dimmer bank section assembly, a plurality of dimmers arranged in superposed rows, an actuating shaft common to the dimmers of each row, an individual actuating assembly for each of said dimmers and associated with the shaft therefor, a master control lever secured to said shaft, a pair of interlock levers carried by but mounted for rotation on said shaft, one of said levers being mounted on each opposite side of said master lever, connections from each of said interlock levers to the actuating shaft of a superposed dimmer row, a device for interlocking the master lever, selectively with each of the adjacent interlock levers, said interlocking device including a pair of interlocking dogs, each pivotally carried by the master lever, a recessed seat for one of said dogs carried by each of said interlock levers, a dog-actuating cam assembly extending through and operable within the master lever, and provided with a camming surface operable to engage said dogs one at a time so as selectively to connect the master lever with said interlock levers, and a handle carried by said camming device and projecting at an angle therefrom so as to indicate the position of said dogs whereby to show the interlock relation between the master lever and the said levers, a cover plate or closure structure through which the master lever projects, and indicating means carried by each of said interlock levers and projecting through the said cover plate, whereby to indicate thereon the position of each of said interlock levers, for interlocking with the master lever.

19. In a lighting control system, a plurality of dimmers disposed in rows, a cover plate for each dimmer, a control shaft for each row, a plurality of recessed, interlock levers disposed on each of said shafts, links connecting the corresponding levers of different shafts, a master lever secured to each of said control shafts, an interlocking device associated with each master lever for selectively connecting the master lever and associated control shaft to the interlock levers thereon, means in front of the cover plate for indicating the interlocking positions of the interlock levers, a master shaft operatively associated with the connecting links and levers for interconnecting the several row shafts, a screw having a rotatable wheel thereon, a nut threadedly carried by the screw and adapted to travel therealong as the wheel is rotated, and a connecting link between the said nut and the said master shaft.

20. In a composite dimmer bank and switchboard assembly, a closure structure including cover plates, a plurality of dimmers arranged in rows at the rear of the closure structure, control levers for the dimmers projecting through the structure to the front thereof, an actuating shaft common to the dimmers of each row, said shaft being disposed along the associated row and at the rear of the closure structure, an individual dimmer control operable selectively with, and upon the associated row shaft, a master lever secured to each row shaft and projecting through the closure structure, a grand master wheel drive assembly adapted coordinatingly to actuate the dimmers of a plurality of the rows, and including for operatively interlocking the several row shafts, paired recessed lever elements on each row shaft disposed at opposite sides of the master lever therefor, an interlocking means for selectively interlocking each master lever with either of the associated recessed levers, an actuating element for operating each individual dimmer control lever, said element having its axis at an angle to the lever whereby to indicate the connective relation of each individual dimmer to its associated row shaft, an indicating element carried by each of the recessed levers to indicate on the front of the closure structure, its position for operative engagement with the associated master lever, and an actuating lever for selectively connecting the master lever and the recessed interlock levers, the last said element having an angulate handle in front of the closure structure, adapted as a pointer to indicate the interlocked relation between the master lever and its associated interlock levers.

21. An actuating assembly for a dimmer employed in connection with a dimmer bank and switchboard, and including a dimmer actuating arm, the board being provided with a cover plate having an elongate opening for said arm, an angularly movable frame by which said arm is carried, a dimmer operating rod extending from said frame to the dimmer, said rod including adjustably related parts whereby to provide for adjusting the effective length of said rod, the said frame including paired elements, one of which engages the rod and the other of which serves to receive the said actuating arm, and means for adjusting the angular relation of said frame elements whereby to coordinate the range of movement of said arm, as determined by said opening in the cover plate, with the required range of movement of said dimmer operating rod.

FREDERICK B. ADAM.